Oct. 19, 1937.   H. W. BUHLER   2,096,606
MOLDED TRIMMING
Filed Oct. 9, 1935   2 Sheets-Sheet 1
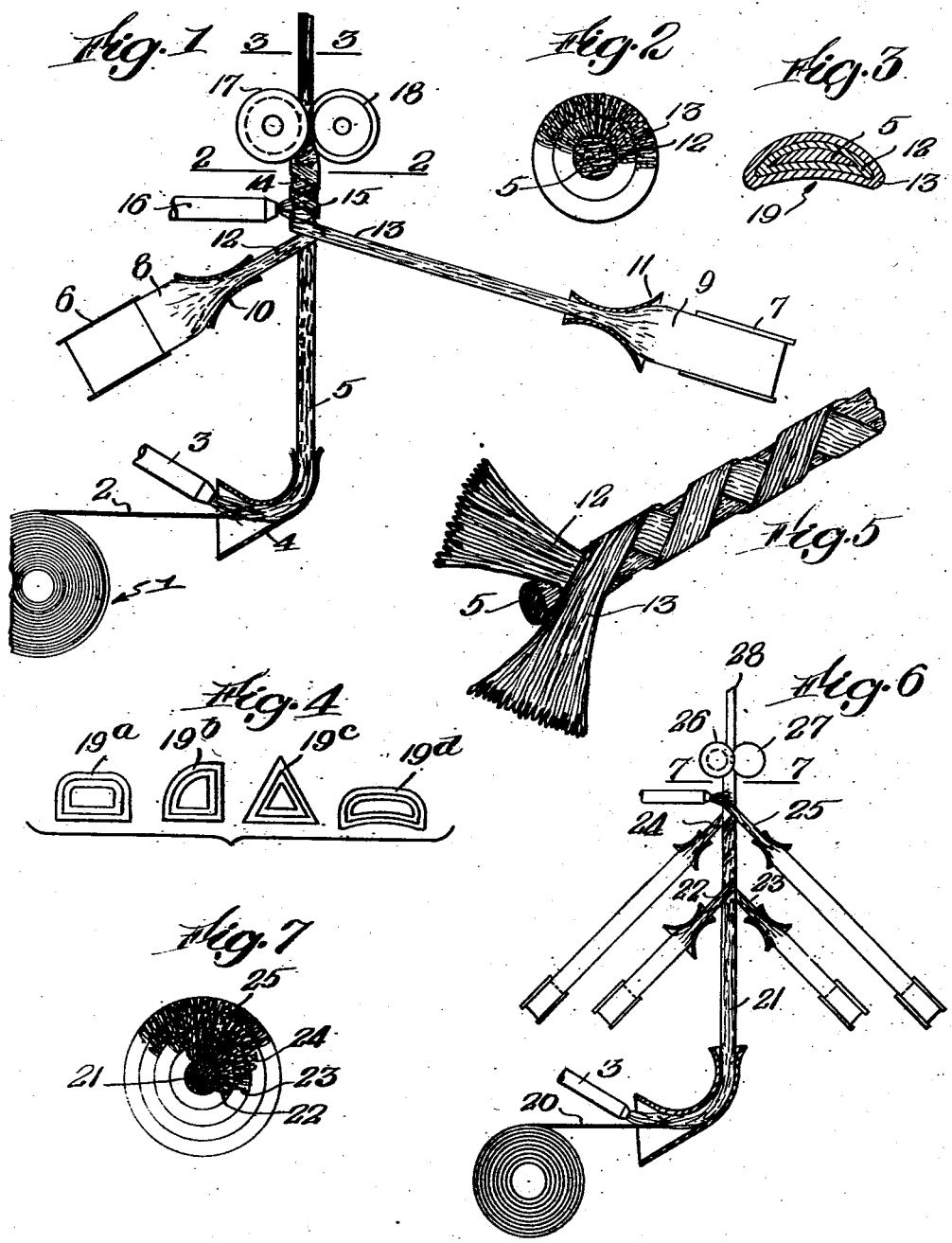
Inventor
Henry W. Buhler
By Roberts, Cushman & Woodbury
Attys.

Oct. 19, 1937. H. W. BUHLER 2,096,606
MOLDED TRIMMING
Filed Oct. 9, 1935 2 Sheets-Sheet 2
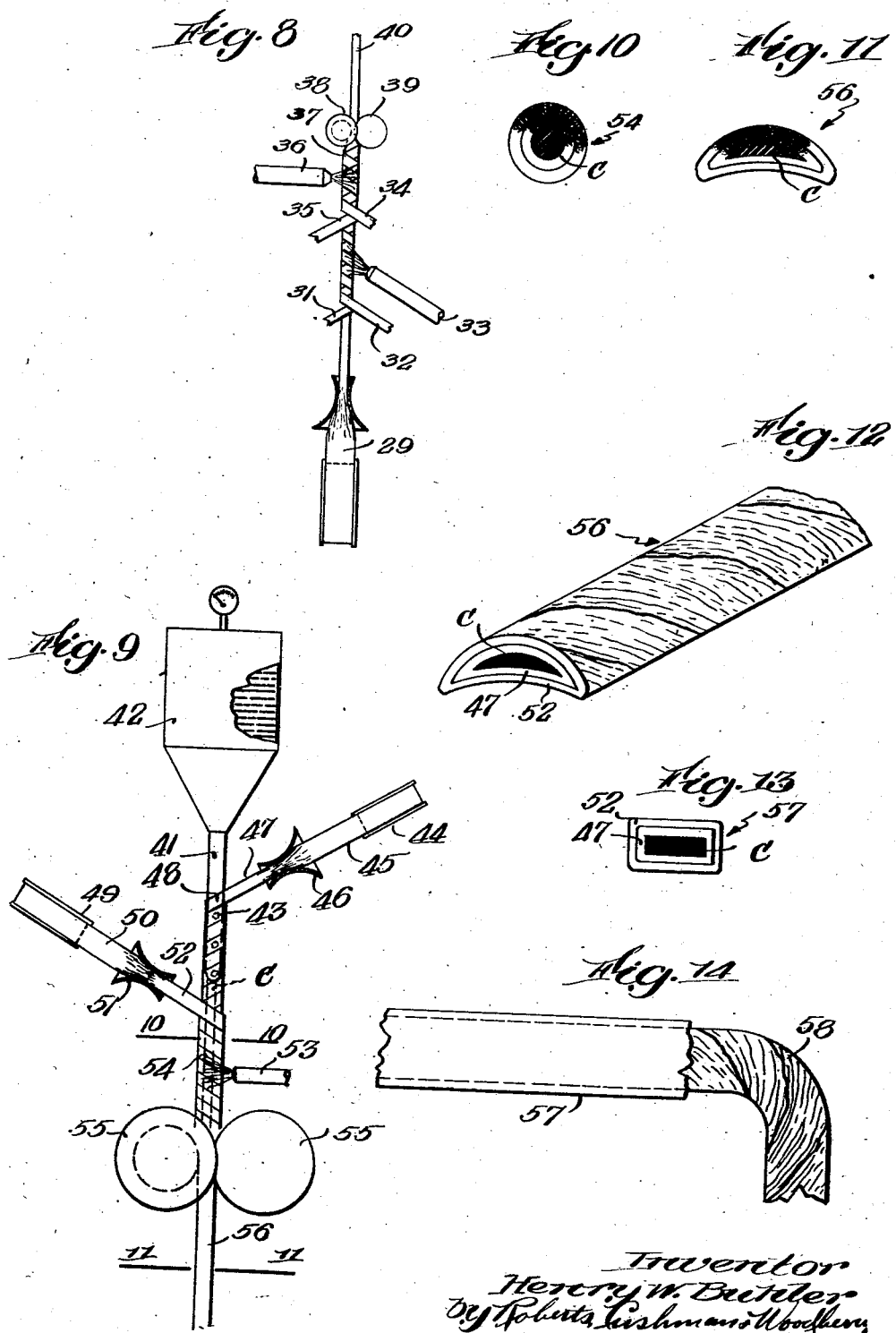

Patented Oct. 19, 1937

2,096,606

UNITED STATES PATENT OFFICE 2,096,606

MOLDED TRIMMING

Henry W. Buhler, Gloucester, Mass.

Application October 9, 1935, Serial No. 44,245

6 Claims. (Cl. 117—34.5)

This invention pertains to molded trimming and to a method of making the same, the present invention constituting an improvement upon that disclosed in my Patent No. 1,820,935, dated September 1, 1931. In said patent I disclosed a novel strand or strip structure suitable for various purposes, for example, to constitute a filler or stuffer for an encasing entubulature, thereby to provide a flexible trimming of the kind extensively used in the manufacture of vehicle bodies.

As pointed out more fully in said patent, it is an essential requisite that such filler or stuffer strand be of a reliably constant cross-sectional shape so that it may be encased in the enclosing entubulature to form a uniform trimming; it must have sufficient flexibility to bend sharply in the direction of its width without breaking or substantially buckling; it must be capable of offering substantial resistance to deformation by crushing or indenting pressure; and preferably should be of such texture as to permit it to be nailed in place by the use of ordinary nails or tacks.

In the patent referred to I have recommended a construction in which a core comprising a bundle of substantially straight, parallel elongate elements is fasciated by a helical wrapping or wrappings consisting, for example, of cords, threads, yarns or filaments or any of the usual textile fibers, or fine metallic wires. The core is disclosed as predominantly composed of hard paper yarns, in some suggested instances associated with a comparatively small number of reinforcing wire strands and soft compressible strands designed to fill the interstices between the hard paper strands.

While the structure disclosed in said patent is desirable for many purposes, its recommended mode of construction, wherein a plurality of preformed strands are employed in the core, is expensive and the urgent demand of automobile manufacturers for material at lower cost makes it difficult to produce the trimming disclosed in said patent at a reasonable profit.

With the object of providing a flexible trimming which may be made more rapidly and cheaply than that of my aforesaid patent, but which at the same time, for some uses, at least, possesses to a sufficient degree the other characteristics desirable in such a trimming, I have devised the present improvement. In accordance with a preferred procedure, it is possible to obtain the desired results by directly associating a single flexible or plastic core strand of appropriate bulk with one or more flexible strands, for example laterally condensed ribbons of crepe paper, in such a way as to form a coherent stuffer structure of substantially uniform cross section; possessing the requisite flexibility for the intended purpose; and which may be made rapidly and at low cost. As a further development, the core strand may be omitted entirely, the stuffer consisting of strands disposed in helical windings, with or without a cementitious binder.

Thus, I may employ a single core element, for example, a ribbon crumpled, folded, or plaited to form a compact but preferably yielding plastic and bulky strand characterized by uniformity of mass per unit of length, and about this core element wrap another strand or strands which may, if desired, be of the same character as the core strand, the wrapping strand or strands preferably being disposed to form a steep pitched open helix or helices,—thereafter subjecting the composite structure to the action of pressure rolls, dies, or the like, either with or without heat, as preferred, thereby to compact the material and at the same time, to reduce it to the desired cross section, for example, half round. Preferably, at some stage in the process a flexible and elastic coating, or impregnant of an adhesive, cementitious and/or waterproof character is applied to the constituent strands or to the composite structure as a unit, such coating or impregnant assisting in preserving the imposed shape and in holding the constituent elements in proper association. If more than one wrapping strand is used, it is preferred to dispose the said wrappings in pairs, one of each pair being wound left-hand and the other right-hand, thereby to provide a balanced structure substantially devoid of tendency to twist.

Under some circumstances, as above suggested, it may be preferred to dispense with the separate core element,—forming the filler or stuffer solely from a pair or pairs of strands, each disposed to form a helix, but without imparting substantial twist to the individual paper ribbons before associating them.

In either case the wrapping operation is preferably carried out by causing coils of untwisted ribbon of substantially uniform width to revolve about an axis in such a way that the ribbons (after first being laterally condensed to form bulky, initially untwisted strands) are laid in helices about such axis as the associated strands are drawn off in an axial direction by or toward the shaping and compressing rolls or dies.

By the employment of ribbons which are of substantially uniform width or at least uniform mass per unit of length, it is possible rapidly and cheaply to form a stuffer structure which is of the desired uniform cross section throughout and thus ideal for use as a filler for an encasing entubulature. By the term "ribbon" I intend to include flexible bands or strips of any desired but substantially uniform width such, for example, as may conveniently be prepared by cutting up sheet material. However, I do not confine myself to the use of ribbon so made, the particular method employed in preparing the ribbons being substantially immaterial to the present invention. While I have found creped kraft paper desirable for the purpose, I do not limit myself thereto nor to paper of any specific kind or character, since I contemplate the use of flexible ribbons or equivalent strips or bands made from any appropriate material. Among such materials there may be mentioned, by way of example, but without limitation, ribbons or strips of unspun textile fiber felted or otherwise joined together to form a coherent structure with or without the inclusion of a cementitious binder; ribbons of unspun sheeted cellulose fiber such as may be prepared from wood pulp,—for instance the material known as "cellulose wadding"; ribbons of thin sheeted regenerated cellulose or of any of the synthetic resins, or the like; ribbons made by uniting, as by cohesion or adhesion, parallel strands, threads, filaments or the like of any kind or character; ribbons of textile fabric, for example, woven, braided, or knitted material; as well as ribbons made of thin metal or metal foil, or combinations of any such materials.

While the present invention is not primarily concerned with the external covering or entubulature, it is to be understood that said entubulature may be of any desired material, for example, metal, textile fabric; molded plastic; condensate resin or the like, and may be of any desired cross-sectional shape and wall thickness, it being characteristic of the stuffer or filler herein disclosed that it provides an inclusion indifferently applicable to any kind of channel relied upon to provide the external surface of the molding or trimming.

In the accompanying drawings wherein certain desirable embodiments of the invention have been disclosed by way of example,—

Fig. 1 is a diagrammatic elevation, partly in section, illustrating one mode of making a stuffer by the use of two strands wrapped about a single core strand;

Fig. 2 is a section, to larger scale, on the line 2—2 of Fig. 1;

Fig. 3 is a section, to larger scale, on the line 3—3 of Fig. 1;

Fig. 4 is a composite view illustrating various other cross sections to which the stuffer may be reduced;

Fig. 5 is a fragmentary perspective view, to larger scale, illustrating the stuffer produced according to the method disclosed in Fig. 1, but before its cross-sectional shape has been changed;

Fig. 6 is a view similar to Fig. 1 but illustrating a method of making a stuffer in which two pairs of ribbons are wrapped about a third or core strand;

Fig. 7 is a section to larger scale on the line 7—7 of Fig. 6;

Fig. 8 is a view generally similar to Fig. 6 but illustrating another method by which two pairs of strands are associated with a core strand;

Fig. 9 is a view illustrating a mode of associating a pair of strands about a plastic core;

Fig. 10 is a section to larger scale on the line 10—10 of Fig. 9;

Fig. 11 is a transverse section on line 11—11 of Fig. 9 showing the stuffer after it has been deformed;

Fig. 12 is a perspective view illustrating the stuffer material resulting from the method of Fig. 9;

Fig. 13 is a transverse section, showing a stuffer similar to that of Fig. 12, but of different shape; and Fig. 14 is a plan view, partly broken away, showing a completed molding with the improved stuffer forming a constituent element thereof.

While the core and wrapping strands may doubtless be made of other materials and by other methods than those herein specifically suggested, it is preferred to employ strands consisting of crumpled, plaited, folded, or otherwise laterally condensed ribbons of the selected material, for instance crepe paper.

Referring to the drawings, and particularly to Fig. 1, which illustrates the use of strands formed from laterally condensed paper ribbons,—a spool 1 or other suitable source of supply carries a ribbon 2 of any desired width and of any of the materials above suggested as suitable for the purpose. This ribbon may, for example, be a strip of creped paper of the order of three inches wide and the spool may be provided with any suitable tension means, not shown, to prevent the ribbon from unrolling too freely from the spool. The ribbon is preferably drawn off past a reservoir 3 which delivers a treating medium, for example, adhesive, cement, plasticizer, tumefying agent, or a waterproofing compound to the ribbon over whose surface such medium may be spread as evenly as desired by any of the usual devices (not shown) commonly employed for such purposes. Preferably the ribbon is passed through a trumpet guide 4 or equivalent device whereby it is laterally condensed, but not intentionally twisted, to form a strand 5 which is plastic, that is to say, readily deformable under compression, and of a width less than that of the original ribbon, but of substantially uniform mass per unit of length. This strand 5 is drawn forwardly through and along the axis of a winding head which may be of any of the kinds familiar to manufacturers of insulated wire and some kinds of rope, such head having oppositely revolving carriers, each usually supporting a plurality of spools, and so actuated that the strands from the several spools are all gathered together at a common wrapping point. For convenience in illustration, only one spool of each carrier is shown in Fig. 1. The spools 6 and 7 carry the ribbons 8 and 9 respectively which pass through the trumpet guides 10 and 11 where the ribbons are condensed to form the initially untwisted strands 12 and 13 which, by the rotation of the wrapping head, are wound about the condensed core strand 5 to form the helices 14 and 15. Preferably these helices are of such steep pitch that their adjacent turns do not overlap. The material is now subjected, if desired, to a spray of a suitable fluid medium, for example adhesive, from a nozzle 16. The material may now be passed through suitable pressure applying means, such as the rolls 17, 18, which compact the constituent elements and which may reduce the composite material to a non-circular shape as indicated at 19 (Fig. 3). This cross-sectional shape may, however, take almost any desired form, for example, as suggested at 19$^a$, 19$^b$, 19$^c$, or 19$^d$, respectively, of Fig. 4.

In Fig. 5 the preferred character of the constituent strands 5, 12, and 13 is more clearly indicated, each consisting, as above described, of a ribbon crinkled, folded, crumpled, plaited or otherwise laterally condensed, whether regularly or irregularly, to form a strand which is initially substantially devoid of twist but of uniform mass per unit of length. While, as illustrated in Fig. 1, binding, waterproofing, wetting, softening or other treating medium is applied during the winding operation, it is contemplated that such media may be omitted, if desired, since if ribbon of proper character be selected, the winding and compressing operations are found sufficient to produce a coherent structure capable of retaining its shape, at least sufficiently long to permit its insertion into an encasing tubulature.

Fig. 6 illustrates a modification of the process illustrated in Fig. 1. In this figure an untwisted ribbon 20 is first condensed laterally to form the untwisted core strand 21 and about this are wrapped the strands 22 and 23 in the same direction to form open helices. Then other strands 24 and 25 are wound in the opposite direction to form open helices, and the composite structure is passed between the pressure applying elements 26, 27 to produce the structure indicated at 28.

Fig. 8 illustrates a further modification in which an untwisted ribbon 29 is laterally condensed to form the untwisted core strand 30. About the plastic or deformable core strand are then wrapped the strands 31 and 32 disposed to form open helices of opposite pitch. Adhesive or other fluid medium may then be applied as by means of a nozzle 33, and the other strands 34 and 35 are wrapped about the structure already formed in open helices of opposite pitch, it being noted that the several helices, counted outwardly from the core, are alternatively of right and left-hand pitch.

Another coating or impregnating medium may now, if desired, be applied as by means of nozzle 36, after which the composite strand 37 passes between presser rolls 38 and 39 or equivalent means which compacts it and reduces it to the final desired cross-sectional shape, for example, substantially half round, as shown in Fig. 11.

In Fig. 9 a further modification is disclosed. In this figure, the numeral 41 designates a hollow arbor or mandrel suitably supported, for example, in vertical position, and having its upper end in communication with a reservoir 42 containing any appropriate medium, for example, a plastic such as dough-like uncured rubber,—synthetic rubber, a cellulose derivative, or compounds of adhesive binding materials with inert or fibrous fillers, etc. The reservoir 42 is representative of any container (heated if desired) for a plastic or fluid medium preferably of a nature such as to form a distinct core for the composite stuffer to be formed. Preferably, the material in the receptacle is kept under pressure so as to flow into and to be extruded from the mandrel.

The mandrel preferably tapers slightly toward its free end, and the walls of the mandrel are furnished with perforations 43 through which the fluid treating medium may exude. The fluid medium thus extruded to the outer surface of the mandrel serves to lubricate the latter as well as to form a core for, or at least to coat or impregnate the strand material as it is wound about the mandrel The numeral 44 designates a spool or the like forming an element of a rotary wrapping head, and this spool carries a coil of strand, or strand-forming material, such for example as the ribbon 45. Preferably there is interposed between the spool and the mandrel a trumpet guide 46 or equivalent device which revolves with the spool and through which the ribbon 45 passes on its way to the mandrel. In so passing through the trumpet guide the ribbon is laterally condensed to form a strand 47 which, as initially formed is substantially devoid of twist, but in which the material of the ribbon is crumpled, folded or plaited so as to form the bulky strand 47 which is of substantially less width than the width of the ribbon but which is of substantially uniform mass per unit of length. As the spool 44 is revolved about the axis of the mandrell this strand 46 is wrapped about the mandrel in the form of a close helix 48 and as the helix is formed, it is drawn off from the end of the mandrel,—the extruded plastic from the receptacle 42 forming a core C, the helix slipping off of the mandrel readily by reason of the film of fluid medium which is interposed between it and the surface of the mandrel,—assisted by the tapering form of the mandrel. The helix thus formed with its plastic core (or lining of adhesive or other material) is drawn off axially and, as it moves along, a second helix is wound around it. For this purpose a second wrapping head is provided comprising the spool 49 which revolves bodily about the extended axis of the mandrel and which carries a coil of strand or strand-forming material, for example the ribbon 50 which may be similar to the ribbon 45,—this wrapping head also preferably being provided with a trumpet guide 51 through which the ribbon passes and in which it is condensed to form a strand 52. If desired a nozzle 53 may be provided to deposit a fluid or plastic medium, such as adhesive, a plasticizer, a waterproofing agent, or the like, upon the outer surface of the composite strand 54. Preferably the spool 49 revolves in the opposite direction from the spool 44 so that the two helices will be of opposite pitch. The strand 54 may now be passed between pressure rolls 55 to give it its final cross-sectional shape. The resultant composite stuffer 56 may be of any desired shape, for example of the cross sections indicated in Figs. 11 or 13, respectively, wherein the core C is embraced by the helical wrappings of the strands 47 and 52. It is to be noted that in some cases, for example if the material supplied from receptacle 42 is not stiffly plastic, the inner helix may be hollow and merely lined with adhesive or the like.

The composite stuffer material thus produced is very flexible and requires a minimum of material in its construction. It is substantially balanced, that is to say, does not exhibit any pronounced tendency to twist in any one direction or the other; it is quite resistant to deformation by compression or percussion; it may readily be nailed in place by the use of ordinary tacks or nails; it may be made very rapidly and by reason of its uniform cross section is adapted uniformly to fill an outer casing or entubulature.

While as above specifically described, the core and wrapping strands are all of substantially the same character, it is within the scope of the invention to employ different materials for the core and wrapping strands, or to use strands made in some other way than by laterally condensing a strip or ribbon, for example, braided or twisted strands of cotton or other textile material, or combination of strands made in different ways.

In Fig. 14 the outer casing or entubulature is shown at 57 and a stuffer 58, prepared in accordance with any of the above-described procedures, for example, such as that illustrated in Fig. 1, is shown as having been introduced into this entubulature.

While certain desirable embodiments of the invention have been illustrated by way of example, it is to be understood that the invention is not to be limited to these particular constructions or modes of procedure but it is to be interpreted as of broad scope and as limited only by the terms of the appended claims.

I claim:

1. Molded trimming having a stuffer comprising a strand of substantially uniform mass per unit of length disposed in a helix of predetermined hand about a flexible core of plastic material, and a second similar strand disposed in a helix of the same hand and coaxial with the first, and a plurality of strands disposed to form helices of the other hand disposed one within the other and about the first two helices.

2. Method of making molded trimming which comprises as steps providing an even number of ribbons each of substantially uniform width, laterally condensing each ribbon to form an initially untwisted strand of substantially uniform mass per unit of length, winding each strand to form a helix whose adjacent turns are spaced apart, the several helices being coaxial, an equal number of the helices being of left-hand and right-hand pitch, respectively, treating the constituent elements at some stage in the process with a cementitious medium, and imparting to the resultant composite strand a predetermined substantially permanent cross-sectional shape.

3. Method of making molded trimming which comprises as steps preparing ribbons of substantially uniform mass per unit of length, laterally condensing said ribbons to form untwisted strands, disposing one of said strands to form a core, winding a second strand in the form of a helix about said core, winding a third strand to form a second helix embracing the first helix but of opposite pitch, applying force in such a way as to compact the constituent elements and reduce the resultant composite stuffer to a non-circular cross section, and encasing the stuffer in an entubulature.

4. Method of making molded trimming which comprises as steps preparing ribbons of substantially uniform mass per unit of length, laterally condensing said ribbons, without substantially twisting them, to form strands, winding one of said strands about a core of plastic material to form a helix, winding a second strand about the first helix, but with opposite pitch, treating the constituent elements with a binding medium, and reducing the resultant stuffer to a non-circular cross section.

5. Method of making molded trimming which comprises as steps preparing ribbons of substantially uniform mass per unit of length, laterally condensing said ribbons, without substantially twisting them, to form strands, winding one of said strands to form a helix while concomitantly intruding a fluent core-forming material into the interior of the helix, winding a second strand to form a helix of opposite pitch about the first helix, winding a second pair of strands to form coaxial helices embracing the first pair of helices, the helices of said second pair also being of opposite pitch respectively, treating the constituent ribbons at some stage of the process with a fluid medium, and shaping the resultant composite structure to a non-circular cross section.

6. Method of making molded trimming which comprises as steps preparing ribbons of substantially uniform mass per unit of length, laterally condensing said ribbons without substantially twisting them to form strands, extruding a plastic material to form a core, winding one of said strands to form a helix embracing said core, winding a second strand to form a helix about the first helix, successively winding other pairs of ribbons to form helices coaxial with the first pair, successive helices counted from the axis outwardly being of opposite pitch, treating the constituent ribbons at some stage of the process with a cementitious binding agent, and encasing the resultant stuffer in an entubulature.

HENRY W. BUHLER.